Figure 1:
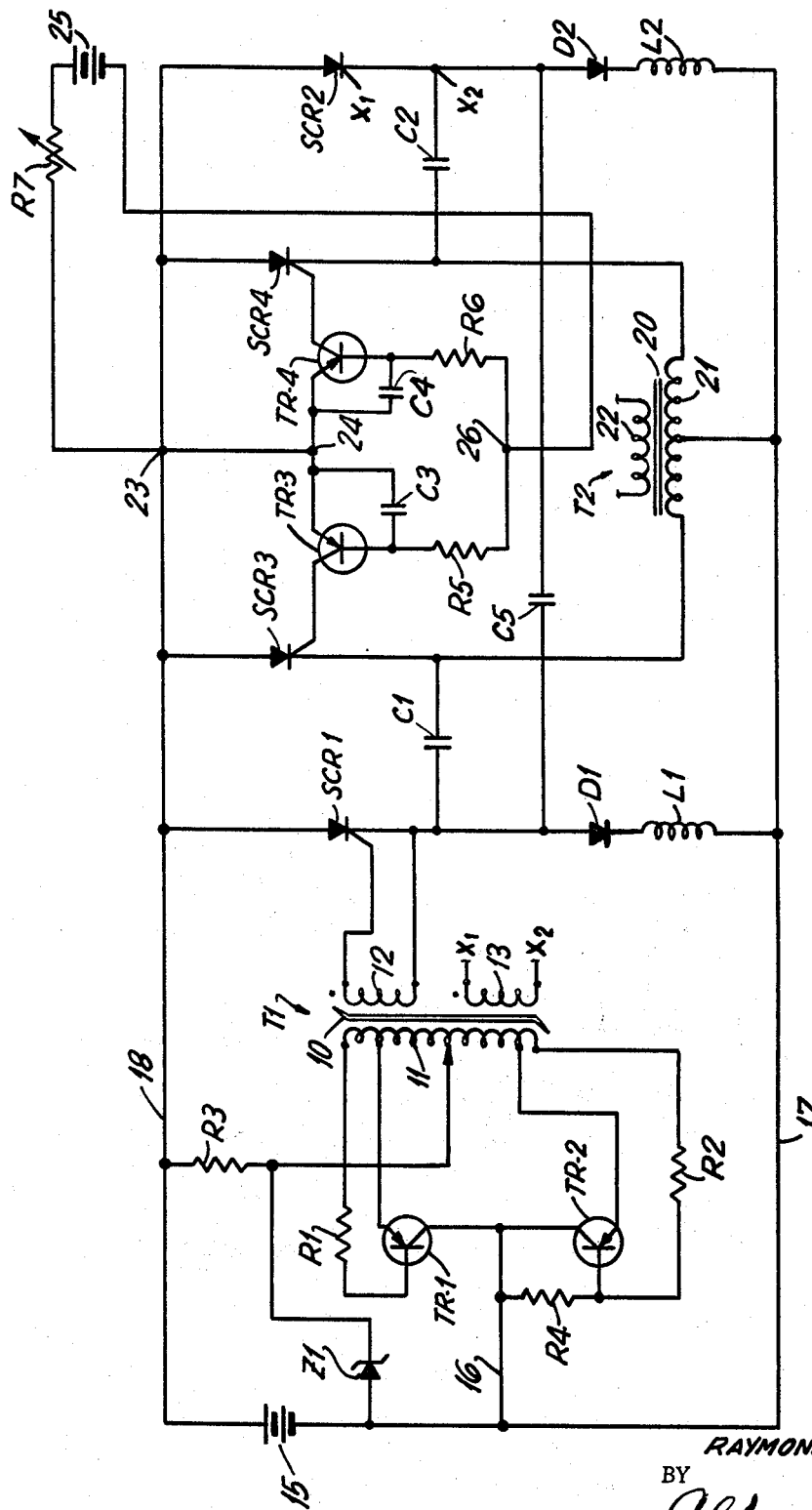

May 28, 1968

R. H. LEGATTI 3,386,028

INVERTER HAVING REGULATED OUTPUT VOLTAGE
AT A CONSTANT FREQUENCY

Filed July 5, 1966

2 Sheets-Sheet 1

INVENTOR.
RAYMOND H. LEGATTI
BY
Alfred E Cage
ATTORNEY.

United States Patent Office 3,386,028
Patented May 28, 1968

3,386,028
INVERTER HAVING REGULATED OUTPUT
VOLTAGE AT A CONSTANT FREQUENCY
Raymond H. Legatti, Clearwater, Fla., assignor to Electromagnetic Industries, Inc., Sayville, N.Y.
Filed July 5, 1966, Ser. No. 562,546
11 Claims. (Cl. 321—18)

This invention relates to inverters, and, more particularly, to a novel and improved inverter in which the output voltage is regulated at a constant frequency.

As is known to those skilled in the art, an inverter changes a D.C. input voltage into an A.C. output voltage. In many prior art inverters, however, the output voltage and the input frequency frequently varies with the input voltage. In addition, prior art inverters free of such variations require an unduly large number of components, and have many other problems, with respect to output voltage and frequency, which have not yet been solved.

For example, know inverters using solid state circuitry including silicon-controlled rectifiers, known as SCR's, have required as many as nine SCR's for a single phase circuit and have tremendous complexities. Furthermore, known arrangements of this type have used a cummutating capacitor between load SCR's, and these have made prior art inverters load sensitive. Finally, many known prior art inverters have not been able to maintain control over the full output range from zero voltage to 100% rated voltage.

An object of the present invention is to provide a novel inverter in which the output voltage and the output frequency are maintained at constant values independent of variations in input voltage.

Another object of the invention is to provide a novel inverter having a regulated output voltage and constant output frequency independent of input voltage and free of the disadvantages of prior art inverters.

A further object of the invention is to provide an inverter involving solid state circuitry and in which only four SCR's are required with respect to regulating a single phase circuit.

Still another object of the invention is to provide a novel inverter involving solid state circuitry including SCR's and in which no commutating capacitor is connected between a pair of load SCR's, whereby the inverter is not load sensitive.

A fourther object of the invention is to provide an inverter of the type just mentioned in which commutating capacitors are connected between each one of a pair of control SCR's and an associated power SCR.

Yet another object of the invention is to provide a novel inverter involving solid state circuitry and including a simplified arrangement for obtaining phase shift of the control voltage.

A further object of the invention is to provide an inverter of the type just mentioned in which control is possible over the full output range from zero voltage to 100% rated voltage.

Another object of the invention is to provide an inverter of the type mentioned, involving solid state circuitry, and in which voltage control may be effected either manually or by a feedback circuit.

A further object of the invention is to provide an inverter including solid state circuitry, as just mentioned, and in which control of the voltage is provided by a feedback control circuit, the feedback control circuit including feedback diodes effective to maintain a high efficiency of the circuit.

An ancillary object of the invention is to provide a novel inverter having the advantages of simplicity, compactness, low cost and high efficiency, as well as being capable of maintaining the output voltage and output frequency at constant values irrespective of variation in the input voltage and of variation in the load.

For an understanding of the present invention, reference is made to the following description of typical embodiments thereof as illustrated in the accompanying drawings.

Figure 2:
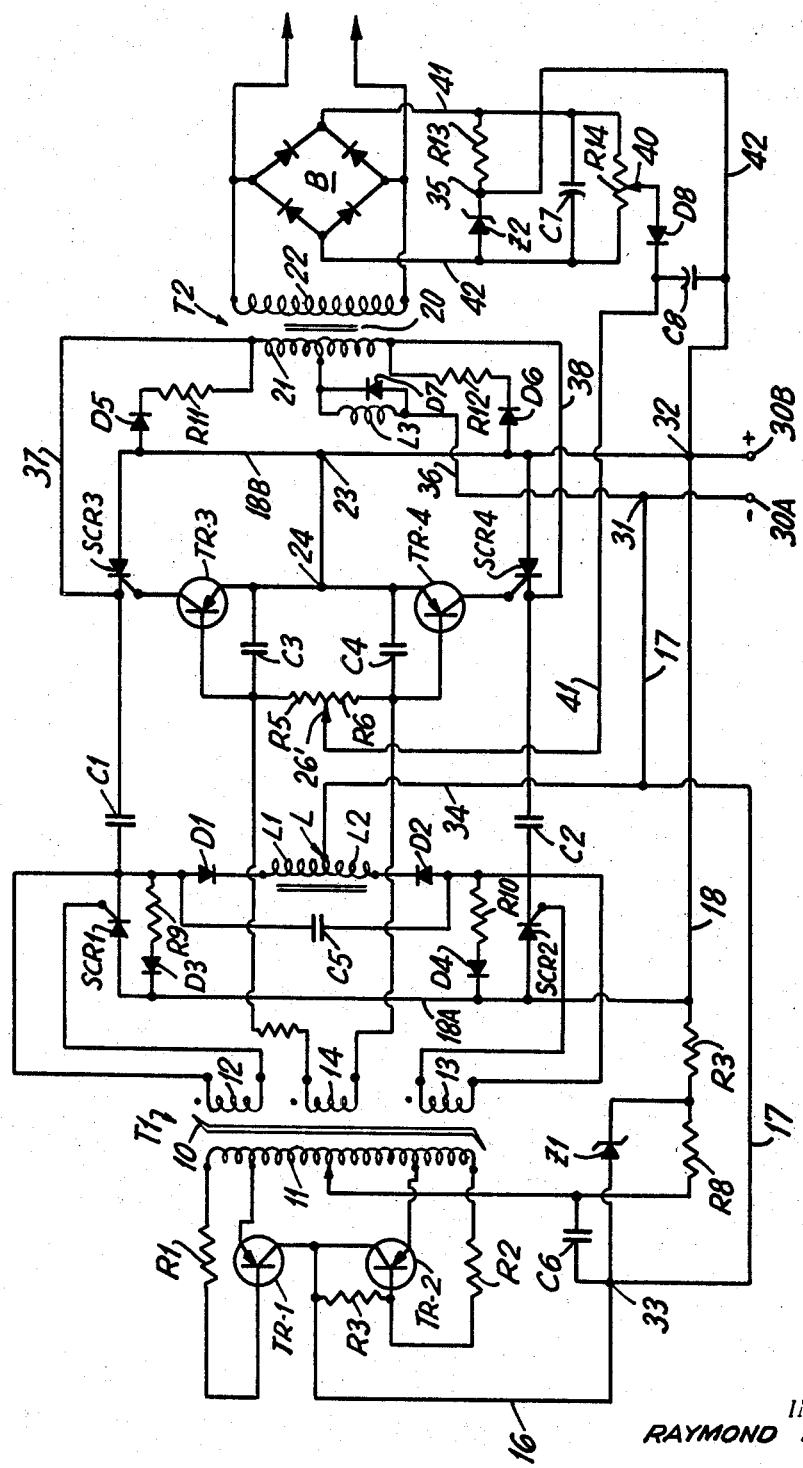

In the drawings:

FIG. 1 is a schematic wiring diagram of an embodiment of the invention inverter in which the output voltage may be manually controlled; and FIG. 2 is a schematic wiring diagram of another embodiment of the invention in which the output voltage is controlled by a feedback circuit.

Referring first to FIG. 1, a transformer T1 is provided having a square loop core 10, a primary winding 11, and a pair of secondary windings 12 and 13. A more or less standard inverter arrangement is provided including the primary winding 11 of transformer T1, a pair of transistors TR1 and TR2, and a source of substantially constant D.C. potential, such as a battery 15. The bases of transistors TR1 and TR2 are connected to opposite terminals of primary winding 11 through respective resistors R1 and R2, and the collectors of the transistors are commonly connected to the negative terminal of battery 15 by a conductor 16. A common negative bus 17 is also connected to the negative terminal or battery 15, and a common positive bus 18 is connected to the positive terminal of battery 15.

A center tap of primary winding 11 is connected to the positive bus 18 through a resistor R3, and the emitters of transistors TR1 and TR2 are connected to taps on primary winding 11 spaced inwardly from the terminals of the latter. A bias resistor R4 is connected between the base and collector of transistor TR2. The input voltage to primary winding 11 is maintained at a constant value by a Zener diode Z1 connected between the center tap of primary winding 11 and the negative terminal of battery 15.

The inverter circuit, as so far described, operates in a manner well known to those skilled in the art. Furthermore, due to the core 10 of square loop material, the output frequency of transformer T1 varies with the input voltage to primary winding 11. As this voltage is maintained constant by the Zener diode Z1, the output frequency of transformer T1 is maintained constant.

As previously mentioned, only four silicon-controlled rectifiers, or SCR's, are needed in the inventive circuit. These four SCR's include relatively small control rectifiers SCR1 and SCR2 and relatively larger power rectifiers SCR3 and SCR4, control rectifier SCR1 controlling power rectifier SCR3 and control rectifier SCR2 controlling power rectifier SCR4. The gating circuit of control rectifier SCR1 is connected across secondary winding 12, and the gating circuit of control rectifier SCR2 is connected across secondary winding 13 as indicated by the terminals $x1$ and $x2$. The anodes of control rectifiers SCR1 and SCR2 are connected to positive bus 18, and the cathode of rectifier SCR1 is connected to negative bus 17 through a diode D1 and an inductance L1. Correspondingly, the cathode of control rectifier SCR2 is connected to negative bus 17 through a diode D2 and an inductance L2.

The control rectifiers SCR1 and SCR2 are gated conductive, in alternation, in accordance with the output frequency of the inverter circuit. During one half wave of A.C. voltage, one control rectifier is gated conductive, and the other control rectifier is gated conductive during the succeeding half wave of A.C. voltage. Control rectifiers SCR1 and SCR2, in a manner to be described, thus control the frequency of the output by controlling the frequency of gating pulses effective on power rectifiers SCR3 and SCR4, respectively.

The cathode of control rectifier SCR1 is connected to the cathode of the associated power rectifier SCR3 through a commutating condenser C1. Similarly, the cathode of control rectifier SCR2 is connected to the cathode of its associated power rectifier SCR4 through a commutating condenser C2. The anodes of the power rectifiers SCR3 and SCR4 are connected to positive bus 18, and the cathodes of the power rectifiers are connected to opposite terminals of the primary winding 21 of a transformer T2 having a core 20 and a secondary or output winding 22. The center tap of primary winding 21 of transformer T2 is connected to negative bus 17.

A condenser C5 interconnects the cathodes of control rectifiers SCR1 and SCR2, but it should be noted that there is no commutating condenser connected between the power rectifiers SCR3 and SCR4. The elimination of this latter commutating capacitor between the load or power SCR's removes the disadvantages, common to many prior art devices, as to load sensitivity. In the present instance, the commutating condensers or capacitors are connected between each control SCR and its associated power SCR rather than between the power SCR's. The commutation is thus effected in the control circuit rather than in the load circuit, so that control can be obtained with the full output from zero voltage up to 100% of rated voltage. This results in a simplified arrangement for obtaining a phase-shifted control voltage.

Gating of the power SCR's is controlled by the associated control SCR's, and also by respective gating circuits. Each gating circuit includes a transistor TR3 and TR4. Each transistor has a capacitor, C3 and C4, connected between its base and its emitter, and the collector of transistor TR3 is connected to the gate of power rectifier SCR3, with the collector of transistor TR4 being connected to the gate of power rectifier SCR4. The base bias for each of the transistors TR3 and TR4 is provided by a respective resistor R5 and R6.

The circuit thus far described operates in the following manner. Control of the pulse frequency is provided by the control rectifiers SCR1 and SCR2. The fundamental frequency is determined by the inverter circuit and may be set at any desired value. As an A.C. potential is applied across the gating circuits of the control rectifiers SCR1 and SCR2 by the respective secondary windings 12 and 13, the control rectifiers conduct alternately during one half cycle and are blocked upon the succeeding half cycle. When a control rectifier is conductive, the associated power rectifier is blocked, and when a power rectifier is conductive, the associated control rectifier is blocked. Thus, when rectifier SCR1 is conductive, rectifier SCR3 is blocked by virtue of the commutating condenser C1. Similarly, when power rectifier SCR3 is conductive, control rectifier SCR1 is blocked through the commutating condenser C1. When control rectifier SCR2 is conductive, power rectifier SCR4 is blocked through commutating condenser C2, and vice versa. Thus, the control rectifiers SCR1 and SCR2 control the commutation of the power rectifiers SCR3 and SCR4, respectively.

While the control rectifiers SCR1 and SCR2 control the frequency of the output pulses of the power rectifier SCR3 and SCR4, the width of the output pulses is determined by the gating period, during each conductive half cycle, of the power rectifiers SCR3 and SCR4. In turn, the width of the output pulses of the power rectifiers, which are applied to the terminals of primary winding 21 of transformer T2, determine the output voltage.

In the arrangement of FIG. 1, control of the output voltage is effected manually by virtue of a battery 25, or other suitable source of substantially constant D.C. potential, connected in series with an adjustable resistor R7. The positive terminal of this series circuit is connected to the positive bus 18 at a junction point 23 and, in common, to the emitters of transistors TR3 and TR4 at a junction point 24. The negative terminal of the series control circuit is connected to the junction point 26 of the resistors R5 and R6. The value of the D.C. potential applied to the transistors TR3 and TR4 determines the time, during each half cycle of A.C., when the associated power rectifier SCR3 and SCR4 is gated, and thus controls the width of the output pulse.

As stated, the cathodes of the power SCR's are connected to the primary winding 21 of output transformer T2, and the output potential is derived from the secondary winding 22 of transformer T2. By suitable selection of the transformer ratio, any desired output voltage within reason may be tapped from the secondary winding of transformer T2.

FIG. 2 illustrates an inverter operating on the same principle as the inverter of FIG. 1, but which has certain additional features including a feedback control of the output voltage. Where components in FIG. 2 are identical with the corresponding component in FIG. 1 and perform the same function, they have been given the same reference character.

In the circuit of FIG. 2, the D.C. input voltage for the inverter is applied at terminals 30A and 30B. Terminal 30A is connected to common negative bus 17 at junction point 31, and therminal 30B is connected to common positive bus 18 at junction point 32. The input to the primary winding 11 of transformer T1 is the same as in FIG. 1, with common negative bus 17 being connected to the anode of Zener diode Z1 at junction point 33, and common positive bus 18 being connected to the cathode of Zener diode Z1 through resistor R3. A resistor R8 is connected in series between resistor R3 and the center tap of primary winding 11, and a condenser C6 is connected between this center tap and the common negative bus.

For a purpose to be described, a third secondary winding 14 is provided on transformer T1 and has the same polarity as the secondary windings 12 and 13. The opposite terminals of secondary winding 14 are connected directly to the bases of the gating transistors TR3 and TR4. With the exception of these minor modifications, the inverter circuit applying an A.C. potential to the control SCR's is the same as in FIG. 1.

In the circuit of FIG. 2, the inductances L1 and L2 are combined into a common center-tapped inductance L whose center tap is connected by a conductor 34 to common negative bus 17. Also, resistors R5 and R6 for transistors TR3 and TR4, respectively, are combined into a single resistor having an adjustable tap 26'. A series combination of a resistor R9 and a diode D3 is connected in reverse polarity relation across the output circuit of control rectifier SCR1, and a series combination of a resistor R10 and a diode D4 is connected in reverse polarity relation across the output circuit of control rectifier SCR2.

A conductor 18A connects positive bus 18 in common to the anodes of control rectifiers SCR1 and SCR2, and a conductor 18B connects positive bus 18 in common to the anodes of power rectifiers SCR3 and SCR4 and also, through junction points 23 and 24, to the emitters of gating transistors TR3 and TR4. The cathodes of power rectifiers SCR3 and SCR4 are connected to opposite terminals of primary winding 21 of output transformer T2 through respective conductors 37 and 38. A blocking diode D5 in series with a resistor R11 is connected between the anode of power rectifier SCR3 and one end of primary winding 21, and a blocking diode D6 in series with a resistor R12 is connected between the anode of power rectifier SCR4 and the opposite terminal of primary winding 21. Junction point 31, connected to negative input terminal 30A, is connected by a conductor 36 and an inductance L3 to the center tap of primary winding 21 of transformer T2, and a blocking diode D7 is connected in parallel with inductance L3.

The circuit so far described acts in the same manner as does the circuit of FIG. 1. The control rectifiers SCR1 and SCR2 provide blocking pulses to the respective power rectifiers SCR3 and SCR4 at the selected inverter frequency, and the power rectifiers SCR3 and SCR4 provide output pulses whose width is determined by the preselected output voltage, these output pulses being provided at the frequency of the pulses applied from the control rectifiers SCR1 and SCR2. The control rectifiers serve to commutate the power rectifiers in the same manner as described, through the commutating condensers C1 and C2. Also, the gating circuits, including the transistors TR3 and TR4, gate the associated power rectifiers SCR3 and SCR4 in accordance with the desired output voltage, by controlling the width of the output pulses from the associated control rectifiers. The secondary winding 14, included in the inverter transformer T1 and connected to the gating transistors TR3 and TR4, serves to assure that these transistors commutate properly in accordance with the instantaneous value of the A.C. voltage. However, in the embodiment of FIG. 2, control of the gating transistors is effected by a feedback circuit which controls these transistors in accordance with the preselected output voltage.

The feedback circuit includes a full wave rectifier bridge B having its input diagonal connected across the terminals of secondary winding 22 of output transformer T2. Feedback conductors 41 and 42 are connected to the positive and negative ends, respectively, of the output diagonal of full wave rectifier bridge B, and a Zener diode Z2 is connected, in series with a resistor R13 at a junction point 35, across the feedback conductors. A by-pass condenser C7 and an adjustable resistor R14 are connected, in parallel with each other, across the feedback conductors, resistor R14 having an adjustable tap 40. A conductor 41 connects tap 40 to adjustable center tap 26' of the resistor R5–R6, and a conductor 42 connects junction point 35 to junction point 32 connected to positive input terminal 30B. A blocking diode is connected in series in conductor 41, and a by-pass condenser C8 is connected between conductors 41 and 42.

Normally, the output voltage is maintained at a preset value set by adjustment of tap 40 by means of the Zener diode Z2. However, should the output voltage vary from the predetermined value, a corresponding feedback voltage is applied through tap 40, diode D8, conductor 41, and adjustable tap 26' to the bases of gating transistors TR3 and TR4. This feedback voltage varies the conductive times of the gating transistor in a manner such as to vary the output pulse widths of the power rectifiers in a manner to restore the output voltage to the predetermined value. Thus, the output voltage is maintained at a constant value, and the output frequency is likewise maintained at a constant value due to the control of the input voltage to the primary winding 11 of inverter T1 correspondingly controlling the output frequency of the secondary windings 12, 13 and 14 of inverter transformer T1, which has the square loop core 10 as previously mentioned in connection with FIG. 1.

In the circuit of FIG. 2, the reactances of the feedback diodes provide a very good means for maintaining a high efficiency of the circuit, the feedback diodes acting, in this instance, as a more efficient device than the usual resistances. The circuit has the advantages of simplicity, compactness, low cost and high efficiency, as well as presenting a simple solution to the problems encountered in the prior art in respect to maintenance of the output voltage and output frequency at constant values irrespective of variations in input voltage and in load.

While specific embodiments of the invention have been shown and described in detail to illustrate the application of the principles of the invention, it will be understood that the invention may be embodied otherwise without departing from such principles.

What is claimed is:

1. An inverter having a regulated output voltage at a constant frequency, said inverter comprising, in combination, an inverter input circuit including an inverter transformer having a core of square loop paramagnetic material; means applying a D.C. potential to said inverter circuit; voltage regulating means connected across said inverter input circuit and maintaining the input voltage to said inverter transformer at a constant value, whereby the output frequency of said inverter transformer is maintained at a constant frequency; a pair of first solid state rectifiers having respective control input circuits connected across the output of said inverter transformer in opposed polarity relation, whereby the first solid state rectifiers are triggered conductively alternatively at said constant output frequency; an output transformer; a pair of second solid state rectifiers having outputs connected in opposed polarity relation across the primary winding of said output transformer; means applying a forward D.C. bias potential across the outputs of all of said solid state rectifiers; a pair of commutating condensers each connecting one electrode of a first solid state rectifier to the corresponding electrode of a second solid state rectifier, whereby said second solid state rectifiers are blocked alternately, at said constant output frequency, by the associated first solid state rectifiers when the latter conduct; each second solid state rectifier, when conducting, blocking the associated first solid state rectifier; voltage-responsive triggering means connected to the input circuits of said second solid state rectifiers and operable to provide a triggering pulse to said second solid state rectifier for a portion of a half cycle corresponding to the voltage applied to said triggering circuit means; and means, including a source of unidirectional potential, operable to apply a predetermined voltage to said triggering circuit means to maintain the output A.C. potential of the secondary winding of said output transformer at a preselected value, said second solid state rectifiers being commutated solely by the associated first solid state rectifiers.

2. An inverter, as claimed in claim 1, in which said first solid state rectifiers are SCR's, and said control input circuits are gating circuits therefor.

3. An inverter, as claimed in claim 1, in which said second solid state rectifiers are SCR's, and said triggering means is a gating means.

4. An inverter circuit, as claimed in claim 1, in which said solid state rectifiers are SCR's, and said control input circuits and said triggering means are gating circuits.

5. An inverter circuit, as claimed in claim 4, in which said voltage regulating means is a Zener diode.

6. An inverter, as claimed in claim 4, in which the output of said inverter transformer comprises first and second stationary windings; the gating circuit for one of said first SCR's being connected across said first secondary winding and the gating circuit for the other of said first SCR's being connected across said second secondary winding.

7. An inverter, as claimed in claim 4, in which said triggering means includes a source of D.C. potential and voltage regulating means connected in series between said source and said gating circuit means for said second SCR's.

8. An inverter, as claimed in claim 4, and which said triggering means comprises a voltage feedback means connected across the secondary winding of said output transformer and to the gating circuit means of said second SCR's, and operable to control the gating period of said second SCR's in accordance with a preselected output voltage of said inverter.

9. An inverter, as claimed in claim 4, in which the gating circuit means for said second SCR's comprises a pair of transistors each controlling the gating of a respective second SCR.

10. An inverter, as claimed in claim 9, including a third secondary winding on said inverter transformer; and means connecting the bases of said transistors to respective opposite terminals of said third secondary winding.

11. An inverter, as claimed in claim 8, in which said voltage feedback means comprises a full wave rectifier, composed of solid state diodes, having its input diagonally connected across the secondary winding of said output transformer; a Zener diode connected across the output diagonal of said full wave rectifier; an adjustable resistance, connected across the output diagonal of said full wave rectifier, and having an adjustable tap; the gating circuit means for said second SCR's comprising a pair of transistors each controlling the gating of a respective second SCR; a solid state blocking diode connecting said tap in common to the bases of said transistors; and circuit means conecting the cathode of said Zener diode to the positive terminal of said means applying a D.C. potential to said inverter input circuit and in common to the emitters of said transistors.

References Cited

UNITED STATES PATENTS

| | | | |
|---|---|---|---|
| 3,101,439 | 8/1963 | Lilienstein et al. | 321—18 XR |
| 3,181,053 | 4/1965 | Amato | 321—45 |
| 3,207,974 | 9/1965 | McMurray | 321—45 |
| 3,262,036 | 7/1966 | Clarke et al. | 321—45 |
| 3,290,580 | 12/1966 | Wolff | 321—16 XR |
| 3,315,144 | 4/1967 | Poss | 321—45 XR |
| 3,315,145 | 4/1967 | Menard | 321—44 |

JOHN F. COUCH, *Primary Examiner.*

WARREN E. RAY, *Examiner.*

WM. SHOOP, *Assistant Examiner.*